May 10, 1966 S. ADLER 3,250,655
METHOD FOR PRODUCING NON-WOVEN FABRIC
Filed Aug. 28, 1961 2 Sheets-Sheet 1
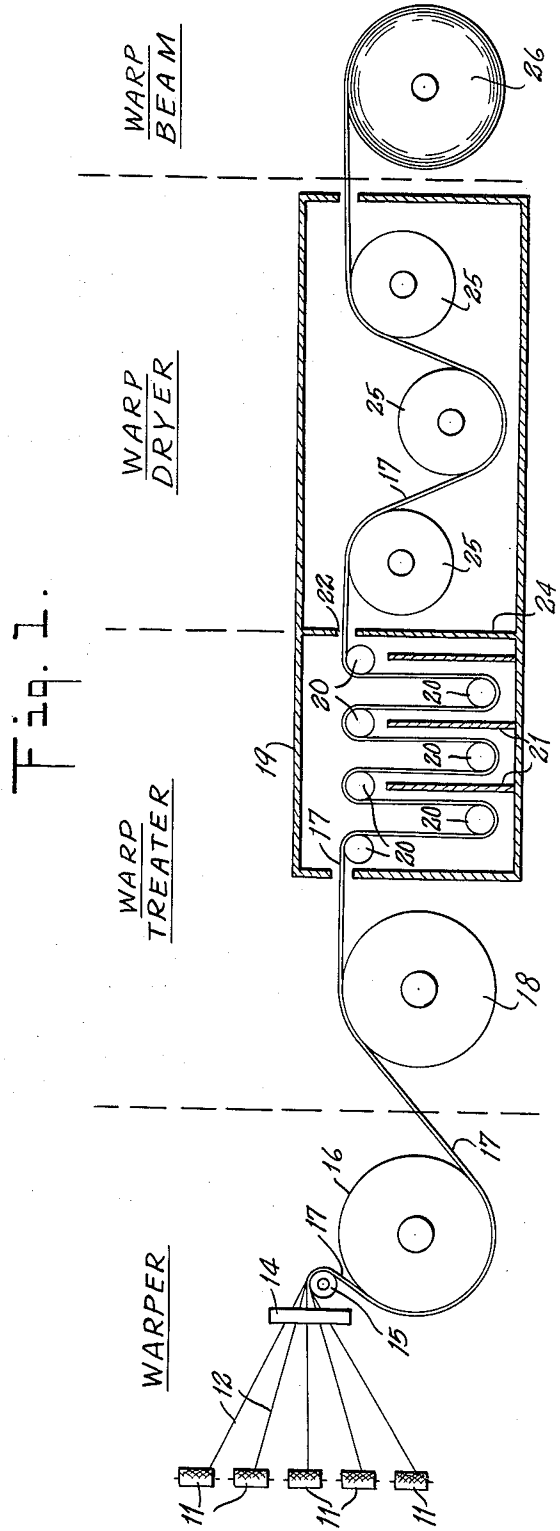
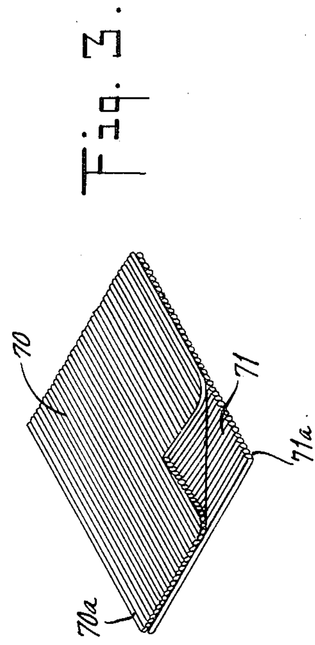
INVENTOR.
SOLOMON ADLER
BY
Thomas F. Moran
ATTORNEY May 10, 1966 S. ADLER 3,250,655
METHOD FOR PRODUCING NON-WOVEN FABRIC
Filed Aug. 28, 1961 2 Sheets-Sheet 2
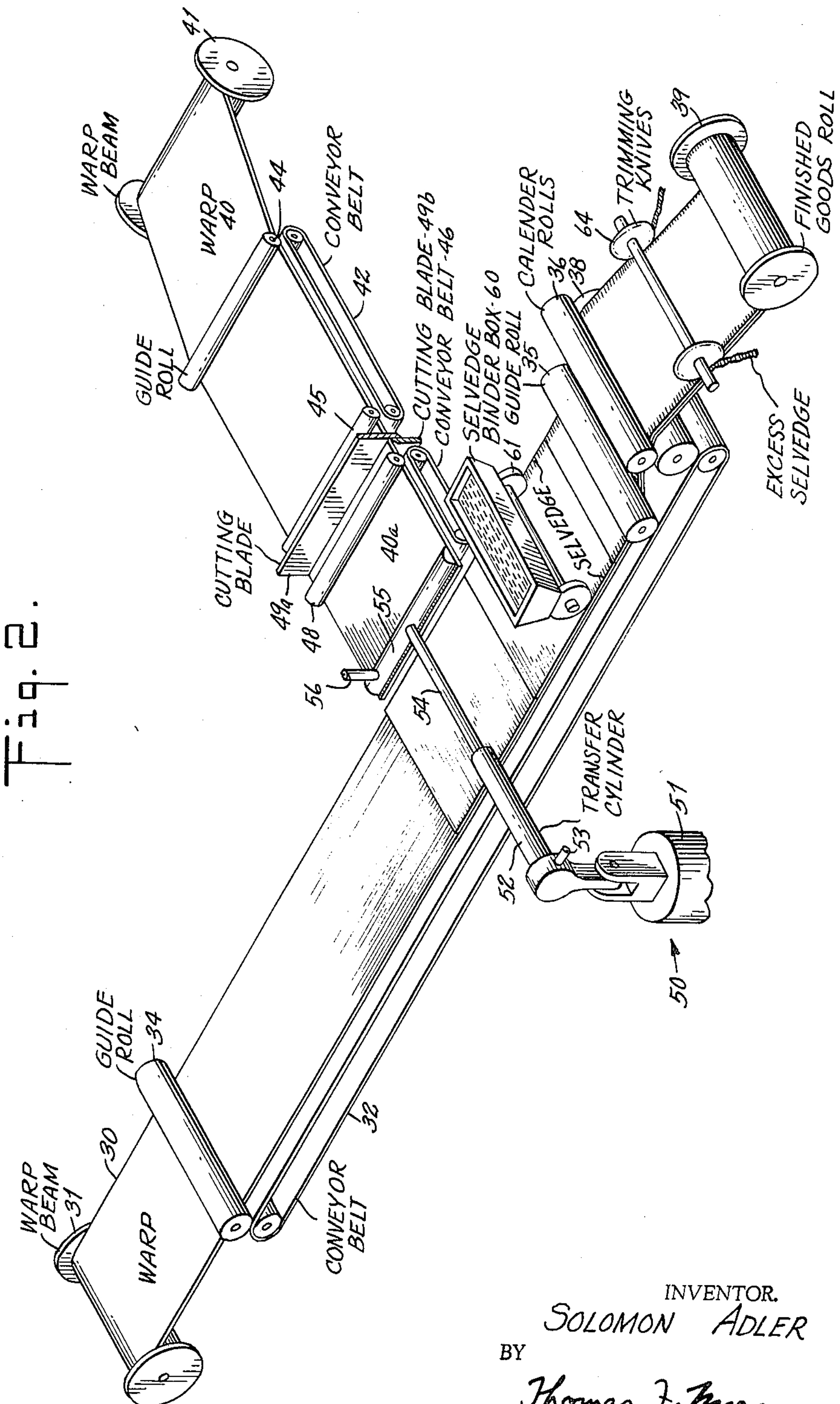
INVENTOR.
SOLOMON ADLER
BY
Thomas F. Moran
ATTORNEY 3,250,655
METHOD FOR PRODUCING NON-WOVEN FABRIC
Solomon Adler, 118—14 83rd Ave., Kew Gardens 15, N.Y.
Filed Aug. 28, 1961, Ser. No. 134,296
13 Claims. (Cl. 156—181)

This invention relates to fabrics, particularly non-woven fabrics. More particularly this invention relates to a method for producing non-woven fabrics having the physical characteristics of woven fabrics and suitable for the manufacture of outer-wear garments and the like. By non-woven fabric is meant a fabric not characterized by the inter-weaving or inter-lacing of the yarns, strands or other filamentary material making up the fabric.

Non-woven fabrics, as presently manufactured commercially, usually comprise a web of short, discontinuous fibers, natural or synthetic, bound together by means of a suitable binding agent or by felting. Such non-woven fabrics are "boardy" in appearance and feel and exhibit little abrasion resistance and for the most part are non-washable and are not generally suitable for the manufacture of outer-wear garments.

In my copending patent application Serial No. 100,267 filed April 3, 1961 entitled Fabric and Method and Apparatus for its Manufacture, now U.S. Patent 3,236,711, the disclosures of which are herein incorporated and made part of this disclosure, I have disclosed a non-woven fabric which is particularly suitable for use in manufacture of outer wear garments and the like. The non-woven fabric disclosed therein comprises an assembly of superposed layers, each of said layers comprising a plurality of side by side, contiguous, unidirectionally oriented continuous length filamentary material, the thickness of each of said layers being substantially the same as the thickness of the filamentary material making up the layer and the filamentary material in at least one pair of adjacent layers of said assembly being disposed in non-parallel relationship with respect to each other. A binding agent is provided between adjacent layers binding together the filamentary material in each of said layers to form said layers and binding said layers to each other, the outside surfaces of the outside layers of said assembly being substantially free of said binding agent. In my above-identified copending application I have also disclosed therein method and apparatus for the manufacture of this special non-woven fabric. The method and apparatus disclosed therein for the manufacture of the non-woven fabric, although suitable for the manufacture of such non-woven fabric on a commercial scale, however, does not permit the manufacture of the non-woven fabrics at relatively high rates of speed.

Accordingly, it is an object of this invention to provide a method and apparatus for the manufacture of non-woven fabrics at a relatively high rate of speed.

Another object of this invention is to provide an improved method for the manufacture of non-woven fabrics.

Yet another object of this invention is to provide a method and apparatus for the high speed manufacture of non-woven fabrics of the type suitable for use in the manufacture of outer wear garments.

Still another object of this invention is to provide a method for the manufacture of non-woven fabrics wherein existing textile machinery, usually employed for the manufacture of woven fabrics, may be employed.

How these and other objects of this invention are accomplished will become apparent with reference to the accompanying disclosure and drawings wherein FIG. 1 schematically outlines various process steps in the manufacture of material, warp, useful in the production of non-woven fabrics in accordance with this invention; and FIG. 2 schematically illustrates assembly of apparatus in accordance with this invention by the manufacture of non-woven fabrics; and FIG. 3 schematically illustrates in a perspective view a non-woven fabric sample prepared in accordance with this invention, the top layer of the fabric being peeled to better illustrate the construction of the fabric and the arrangement of the fibers therein.

In at least one embodiment of the practice of this invention at least one of the foregoing objects will be achieved.

In accordance with this invention a non-woven fabric is manufactured by placing a length of a warp i.e. a coherent sheet or band, comprising a plurality of side by side, contiguous, continuous length, unidirectionally oriented filamentary material, onto another length of warp, also comprising a plurality of side by side, continuous unidirectionally oriented continuous length filamentary material and binding together the resulting assembled warps. Still more particularly, in accordance with this invention a warp or sheet comprising a plurality of unidirectionally oriented, contiguous, side by side, continuous length filamentary material is placed onto another length or portion of warp comprising a plurality of unidirectionally oriented contiguous side by side filamentary material to form an assembly of warps wherein the filamentary material comprising one of the warps is disposed in a non-parallel relationship with the filamentary material of the warp in contact therewith. The resulting assembled warps are then bound together by means of a suitable binding agent to form a non-woven fabric.

Still more particularly, a non-woven fabric is prepared in accordance with this invention by forming a first warp comprising a plurality of continuous length filamentary material, forming a second warp comprising a plurality of continuous length filamentary material, disposing a portion of the second warp in surface to surface contact with a portion of said first warp, the filamentary material in said portion of said second warp being disposed in non-parallel relationship with respect to the filamentary material in said portion of said first warp and binding together the contacting surfaces of said portions of said first warp and said second warp to produce the non-woven fabric as product. It is particularly preferred in the practice of this invention that the filamentary material comprising each of the layers or warps of the fabric be disposed such that the filamentary material in adjacent layers or warps is at an angle of about 90° with respect to each other, i.e. the filamentary material in one layer or warp is disposed transversely or non-parallel with respect to the filamentary material in the other contacting adjacent warp or layer.

Accordingly a non-woven fabric prepared in accordance with this invention comprises an assembly of superposed warps or layers, each of said layers or warps comprising a plurality of side-by-side contiguous undirectionally oriented, continuous length filamentary material, the thickness of each of said layers being substantially the same as the thickness of the filamentary material making the layer, the filamentary material in at least one pair of adjacent layers of said assembly being disposed in non-parallel relationship and with respect to each other and a binding agent provided between adjacent layers binding together the filamentary material in each of said layers to form said layers and binding said adjacent layers to each other, the outside surface of the outside layers of said assembly being substantially free of said binding agent.

The non-woven fabric or fabric structure prepared in accordance with this invention may comprise two or more superposed layers or warps of continuous length filamentary material depending upon the thickness desired in the resulting fabric. Satisfactory fabrics have been prepared employing only two layers of filamentary material, the filamentary material in one layer being disposed in a non-parallel (e.g. an angle in the range 30–90°) crossing relationship with respect to the filamentary material and the adjacent layer. In the instance where more than two warps or layers, such as 3 to 6 or more layers, comprise the non-woven fabric structure or assembly prepared in accordance with this invention, although it is preferred that the filamentary material and all adjacent layers be disposed in non-parallel relationship, such as about 90° apart, the filamentary material and one or more pairs of adjacent layers may be disposed in substantially parallel, non-crossing relationship provided the filamentary material in at least one pair of adjacent layers of the assembled fabric structure is disposed in non-parallel, crossing relationship.

The non-woven fabrics prepared in accordance with this invention are characterized in that the filamentary material making up the superposed separate layers or warps is substantially continuous length filamentary material. Specifically, in the practice of this invention the plurality of filamentary material making up the separate layers or warps of the fabric is made up of continuous length filamentary material extending completely along the fabric in the direction in which the filamentary material is oriented and disposed in its respective warp or layer. Accordingly, no weak spots within the fabric structure, i.e. in one or more layers making up the fabric, are present due to discontinuities in the filamentary material making up the fabric structure. It is particularly preferred in the practice of this invention that the filamentary material making up a given warp or layer of the fabric be derived from a given group of continuous length filamentary materials and that there be no discontinuities in any of the filamentary material making up the group and aforesaid warp or layer.

The filamentary material making up the layers of the non-woven fabric produced in the course of this invention may be of any suitable material, such as strands or yarns or filaments or mono-filaments or strands comprising a plurality of mono-filaments, of natural or synthetic material, organic or inorganic, or mixtures thereof. Suitable filamentary material may be made of cotton, silk, wool, linen, mohair and other animal or plant fibers, as well as the artificial or synthetic fibers such as rayon, acetate, nylon, Dacron, Dynel, glass, rock wool, etc, or mixtures thereof. Particularly suitable in the manufacture of a fabric in accordance with this invention are cotton and other textile materials suitable and desirable for use in outerwear garments and the like. In general, substantially any filamentary material may be employed in the manufacture of a non-woven fabric in accordance with this invention.

The filamentary material making up each of the layers or warps comprising the fabric is bonded together to form a coherent substantially self-supporting layer and the adjacent layers bonded together by means of a suitable bonding agent. Substantially any bonding agent may be employed in the practice of this invention depending upon the characteristics desired in the finished fabric and/or the chemical and physical properties of the filamentary material in making up a fabric and to which the binding agent is applied. The bonding agent should be compatible with the filamentary material making up the fabric structure and effective for its desired purpose, i.e. to bind together the filamentary material to which it is applied and the layers of filamentary material making up the non-woven fabric structure. Usually the bonding agent is applied to one or more layers of the filamentary material making up the fabric and the thus treated layers assembled or superposed such that the coated surfaces of the layers are in contact with each other or in contact with an uncoated surface of another layer. In such an arrangement the bonding agent is disposed between adjacent layers of filamentary material in the fabric structure and may even be separately identifiable therein as a separate layer.

When the filamentary material employed in the manufacture of a fabric in accordance with this invention possesses or exhibits properties of thermoplasticity or is thermoplastic or, even, thermosetting, the use of a separate or extraneous bonding agent may be avoided. By suitable technique thermoplastic or thermosetting filamentary material making up one or more layers of the fabric structure can be treated, e.g. by the application of heat and pressure, to bind itself together to form a coherent layer and, also, to bind itself with the filamentary material making up an adjacent layer.

Various methods may be employed to bind together the filamentary material making up a layer or warp of the fabric structure and/or to bind adjacent layers of filamentary material together. One such method involves coating or applying to the filamentary material making up one or more layers a material which is activated by contact with a solvent or other activating agent or medium to bind together the thus-coated filamentary material and adjacent layers of filamentary material in contact therewith.

Another method of binding together layers of filamentary material, the so-called "dry binder" system, involves the use of finely-divided thermoplastic material, such as short length thermoplastic fibers or finely-divided, dispersed thermoplastic materials. In accordance with this system one layer of filamentary material is bound to another layer of filamentary material and advantageously the filamentary material in the given layer is bound together. In the so-called dry binder system a layer of filamentary material prepared in accordance with this invention is treated or coated with a light spray of resin, such as acrylate or methacrylate or ethyl acrylate, butyl methacrylate, isobutyl methacrylate, ethyl methylacrylate and the like. Finely divided thermoplastic material is then distributed on the resulting resin coated surface of the filamentary material so as to coat a substantial area thereof. The thus-coated layers of filamentary material are assembled together such that the coated surfaces come into contact and the resulting assembly passed between heated rolls at an elevated temperature, such as about 340° F. and at an elevated pressure e.g. in the range 25–100 p.s.i., sufficient to soften and render fluid the thermoplastic material and to effect sealing or binding together of the thus treated layers.

Another method of applying a binding agent onto the filamentary material and to the layers thereof to be bonded together, the so-called "wet binder" system involves the application of polymer latices to the filamentary material, preferably employing aqueous polymer latices. In this technique a latex emulsion, such as emulsion of butadiene-acrylonitrile, butadiene-styrene, acrylate polyvinylchloride, polyvinylacetate, polychloroprene, and carboxy-modified latices of butadiene-styrene and butadiene-acrylonitrile, epoxy resins, isocyanate resins (polyurethane), melamine resins, melamine formaldehyde phenolic resins, phenolic-epoxy resins, polyamide resins, polyamide-epoxy resins, polyester resins, casein, resorcinol resin, etc., is applied to the sheets or layers of filamentary material undergoing treatment. The thus treated surfaces are placed together in accordance with the practices of this invention and passed through heated calendar rolls or otherwise subjected to pressure at an elevated temperature e.g. a temperature in the range 200–350° F. and a pressure in the range 20–100 pounds per square inch effective to effectively activate the polymer latices and to bind together the thus coated layers of filamentary material.

In the instance where the binding agents tend to be or are film-forming it may be desirable, in order to improve the breathability of the resulting formed non-woven fabric, to include a blowing agent in the bonding agents or otherwise to incorporate on the treated surfaces of the layers of filamentary material to be bound together a blowing agent so as to form between the layers of filamentary material a cellular, porous structure of bonding agent. Usually an amount of blowing agent in the range 0.5–10% by weight of the bonding agent yields satisfactory results. For example diazoaminobenzene may be employed as a blowing agent in admixture with polyvinylchloride as the binding agent or diisocyanate may be employed as the blowing agent with a casein resorcinol bonding agent. Other blowing agents which are useful to improve the breathability of the fabrics prepared in accordance with this invention and containing bonding agents which tend to be film forming or otherwise tend to reduce the breathability of the resulting fabric, include an admixture of sodium bicarbonate and oleic acid, ammonium carbonates and mixtures of ammonium chloride and sodium nitrite.

When the blowing agent is employed in admixture with the bonding agent to improve the breathability of the fabric, it is desirable that care should be taken so that during the decomposition of the blowing agent with the resultant release of gas the released gas does not disrupt the orientation of the filamentary material making up the layers so as to cause the filamentary material to separate within each layer or from layer to layer and/or to cause the bonding agent to be displaced from between the layers to the outside surface of the assembled layers. Accordingly it is preferred that when a blowing agent is incorporated in the fabric structure to improve the breathability thereof, to first decompose or activate the blowing agent at a reduced temperature and then to pass the sheets or layers of filamentary material through heated rolls at a rather elevated temperature to activate the bonding agent therebetween and subsqeuently to rapidly cool the resultant treated fabric or assembly of layers.

Referring now to the drawings which schematically illustrate apparatus suitable for carrying out a method in accordance with this invention for the manufacture of non-woven fabrics, and in particular to FIG. 1 thereof, there is illustrated therein an apparatus and method in accordance with this invention utilizing existing textile equipment for the manufacture of a warp or layer of material useful in the manufacture of non-woven fabrics. As illustrated in FIG. 1, bobbins 11 supported on a suitable creel, not shown, supply a plurality of continuous length of filamentary material 12 to reed or comb 14 whereby the filamentary material is arranged and aligned to pass onto guide roller 15 to form thereon a substantial sheet or warp 17 of the filamentary material. The warp 17 of filamentary material wherein the filamentary material is unidirectionally aligned in contiguous, side by side relationship then passes onto warp beam or warp roll 16. The filamentary materials so aligned and assembled to form warp 17 on warp beam 16 may run onto warp beam 16 to fill the beam or, as illustrated, may be run continuously from warp beam 16 to a subsequent treating operation in accordance with this invention. The above described operation wherein a plurality of continuous length filamentary materials are assembled to form a warp is designated in FIG. 1 as the warper section of the operations illustrated therein. This is a conventional warping operation well known in the textile industry wherein a plurality of separate continuous length filamentary materials are aligned and compacted to form a sheet of filamentary material having the thickness of the filamentary material making up the same. Accordingly, in the warping operation or in the warper, as illustrated, there is formed a warp or layer or sheet of parallel aligned filamentary material, the formed warp having the thickness of the filamentary material making up the same.

From the warper section the warp 17 is supplied from the warp beam 16 to the treater section of the apparatus of this invention. Within the treater section, warp 17 from the warp beam 16 is supplied from guide roll 18, which might be warp beam 16 transferred from the warper section, wherein it is led to treater tank 19 and therein passed over a plurality of guide rolls 20. Treating tank 19 is provided with baffles 21 therein to separate the treating tank 19 into various treating compartments wherein warp 17 is sprayed with or immersed in various treating solutions. A suitable treating operation carried out within treating tank 19 is a sizing operation. Within tank 19 warp 17 is sized, if necessary or desirable, by coating or contacting the filamentary material making up warp 17 with a suitable sizing solution such as starch solution to improve the physical properties, such as the strength or lubricity of the filamentary material making up warp 17.

Desirably within treating tank 19 binding agent is applied to one side only of warp 17 undergoing treatment therein. The binding agent employed to coat or treat the warp therein should be compatible with the sizing material if employed to treat or coat the warp material.

The resulting treated warp will leave tank 19 via opening 22 in wall 24 thereof and passes over drying rolls 25 so as to dry the treated warp. Treated warp 17 is wound up on wind up roll or warp beam 26. The warp accumulated and wound up on roll 26 comprises a continuous and coherent sheet made up of a plurality of continuous length filamentary material, the warp being coated only on one surface thereof with binding agent.

In FIG. 1, three operations or sections illustrated are a warping operation employing a warper wherein a plurality of continuous length filamentary materials is assembled together to form a warp, a treating operation wherein the warp is treated, if desired or necessary, by the application of sizing material thereto e.g. a starch solution and the like to improve the physical properties thereof, and also by the application of a binding agent to one surface of the warp and a drying operation wherein the treated warp is dried to form a substantially dry coherent sheet or warp. As another illustrated operation, the warp or laid fabric from the dryer rolls is then assembled or wound on a suitable roll to yield a roll of warp. Also, as illustrated, the operations of FIG. 1 may be carried out on a continuous basis. The filamentary material being continuously supplied from bobbins 11, continuously formed into a warp in the warper section, the warp continuously treated in tank 19 and dried therein, and then continuously wound to form warp beam 26. If desired the warper section can be operated independently, that is, the continuous lengths of filamentary material from bobbins 11 can be passed through reed 14 and onto guide roll 15 to form a warp and the thus formed warp wound on roll 16. This warp roll can then be supplied subsequently to the treating section of the process.

Referring now to FIG. 2 of the drawing which schematically shows apparatus in accordance with this invention for the manufacture of non-woven fabric, warp 30 from warp beam 31, such as manufactured in accordance with the operations illustrated by and described in connection with FIG. 1 and having one surface, the top surface as shown, coated with a bonding agent, is led onto the top of conveyor 32 passing under guide rolls 34 and 35 and calender roll 36 of a pair of calender rolls 36 and 38, thence to wind up roll 39. A second warp 40 from warp beam 41, the second warp 40 comprising in effect the weft portion of the non-woven fabric of this invention, in a similar manner is passed onto conveyor belt 42 beneath the guide rolls 44 and 45, and then onto conveyor 46 beneath guide roll 48. Cutting blades **49*a*, 49*b* are positioned in the space between conveyor 42 and 46. This second warp 40 is manufactured, desirably in the practice of this invention, in the same manner as warp 30 and may be the same as or different from warp 30**, and likewise has one surface, the bottom surface as shown, coated with a bonding agent.

Pneumatically operated transfer assembly, generally indicated by reference numeral 50, is adapted to pick up and draw a cut portion of warp 40 across and onto a portion of warp 30. Transfer assembly 50 comprises standard 51 which supports transfer cylinder 52, which may be fluid: e.g. air, operated via tubing 53, and which in turn moves transfer bar 54 back and forth. Transfer head 55, fixed to transfer bar 54 has a suction intermittently generated therein via tubing 56 so that under suction and upon contact with a severed warp portion 40*a* of warp 40, transfer head 55 serves to pick up severed warp portion 40*a* and upon movement of bar 54 into transfer cylinder 52 severed warp portion 40*a* is moved across warp 30 and is placed on top of warp 30 at the transfer station where it is released. The coated bottom surface of warp portion 40*a* and the coated top surface of warp 30 are now in contact.

In the operation of the device illustrated in FIG. 2, warp 30 and warp 40 on conveyor 32 and conveyors 42 and 46 respectively move simultaneously and at periodic intervals in increments whereby warp 30 on conveyor 32 moves a distance equal to the width of the warp 40 and warp 40, actually severed portion 40*a*, moves on conveyor 46 transversely with respect to warp 30 a distance equal to the width of warp 30. Upon reaching their designated positions, conveyor units 32 and 42 and 46 stop. Thereupon rolls 45 and 48 are caused to press warp 40 so as to clamp and firmly hold warp 40 between cutting blades 49*a* and 49*b*. Cutting blade 49*a* is then caused to descend against the thus clamped warp 40 and in cooperation with cutting blade 49*b* to sever the same and to produce severed warp portion 40*a*, which rests freely on the top of surface conveyor 46. The vacuum operated pick up or transfer 55 is then caused to contact the free severed warp portion 40*a*.

Severed warp portion 40*a* is slightly lifted and drawn forward and deposited on warp 30 at the transfer station and is placed in substantially exact edge to edge relationship with the underlying warp 30. After this operation, transfer head 55 and transfer bar 54 return to position illustrated in FIG. 2. Conveyors 32 and 42 and 46 are again operated and warp 30, now containing warp portion 40*a* thereon, is carried toward and between calender rolls 36 and 38. On the way to calender rolls 36 and 38 the assembled warps 30 and 40*a* pass under the selvedge binder box 60 and there is deposited on the edge of the assembled warps by means of pickup wheels 61 a suitable selvedge sealing agent, such as a resin, e.g. a thermosetting resin, which is contained with selvedge binder box 60. This material is deposited on the edge of the assembled warps. The assembled warps 30 and 40*a* containing the selvedge sealing agent, such as a thermosetting resin, deposited on the edge portions thereof, upon continued operation of the conveyor 32 pass beneath guide roll 35 and through heated calender rolls 36 and 38 whereby the applied thermosetting resin or thermoplastic sealing resin, is activated and seals together the edges of the assembled warps. At the same time the bonding agent deposited upon the contacting surfaces of warp 40*a* and 30 is activated so as to bind together the assembled warps. The resulting bound warps are then passed under rotating, trimming knives 64 so as to remove excess selvedge from both sides of the assembled warps and to produce a finished, non-woven fabric of uniform width. The resulting trimmed assembled warps upon continued operation of conveyor 32 are then wound up as finished goods onto wind up roll 39.

Referring now to FIG. 3 of the drawings, there is illustrated therein schematic form a two-layer non-woven fabric prepared in accordance with this invention, the top layer corresponding to the weft of an ordinary woven fabric and equivalent to warp portion 40*a* of FIG. 2 is partially peeled back to better illustrate the construction of the non-woven fabric. Top layer 70 comprises a plurality of separate, continuous length filamentary material, such as cotton yarn or thread 70*a* and the bottom layer 71 corresponding to the warp of an ordinary woven fabric and equivalent to warp 30 of FIG. 2 also comprises a plurality of separate, continuous length filamentary material, such as cotton thread or yarn 71*a*.

Filamentary material 70*a* is disposed and in contact with filamentary material 71*a* such that filamentary material 70*a* runs transversely or perpendicularly, 90°, with respect to filamentary material 71*a*. If desired, substantially any non-parallel, crossing relationship may exist betwen filamentary material 70*a* and 71*a*. For example, filamentary material 70*a* and 71*a* may intersect each other at an angle of about 45°, such that the resulting non-woven fabric can be said to have been cut on a bias. Generally, the filamentary materials of adjacent layers or warps of a non-woven fabric prepared in accordance with this invention are arranged and disposed with respect to each other so as to intersect at an angle in the range 30–90°.

Substantially any number of filaments or threads or yarns or strands per linear inch, measured in a direction transverse to the length of the filamentary material, may be employed in the preparation of a layer (warp) for the manufacture of a non-woven fabric in accordance with this invention. For example, depending upon the size or thickness or diameter of the filamentary material there may be present a number of filaments in the range 10–1000, more or less, per linear inch measured transversely of the filaments. Similarly, the thickness of each layer of filamentary material will depend upon the thickness or diameter of the filamentary material making up the layer. For example, the thickness of a layer of filamentary material assembled in accordance with the practices of this invention may be in the range 0.001–0.1", more or less.

By using different colored filamentary materials or specially prepared or textured filamentary materials a very great variety of patterned and textured non-woven fabrics can be produced. Non-woven fabrics can be prepared for subsequent treatments such as dyeing, printing and finishing, e.g. water repellency, shrinkage control, flame resistance, fungus and mildew resistance, etc. If desired, these features and properties may already be incorporated in the filamentary material prior to the manufacture of the non-woven fabric therefrom. Further, the calender rolls employed in the apparatus of this invention may also function as embossing rolls so as to impart designs to the surface of the finished fabric.

In accordance with a special feature of this invention more than one, i.e. two or more warps 40 together with associated equipment, i.e. conveyors 42 and 46 and cutting blades 49*a* and 49*b*, etc., may be employed in parallel and/or side-by-side relationship on the same or different sides of warp 30 so that a plurality of severed warp portions 40*a* are laid down on warp 30 thereby greatly speeding up the manufacture of the fabric.

As will be apparent to those skilled in the art in the light of the foregoing disclosure, many modifications, alterations and substitutions are possible in the practice of this invention without departing from the spirit or scope thereof.

I claim:

1. A method which comprises forming a first warp comprising a plurality of contiguous, unidirectionally oriented continuous length filamentary material, forming a second warp comprising a plurality of contiguous, unidirectionally oriented continuous length filamentary material, cutting a portion of said second warp, disposing said portion of the second warp in surface to surface contact with a portion of said first warp, the filamentary material in said portion of said second warp being disposed in non-parallel relationship with respect to the filamentary material in said portion of said first warp and binding together the contacting surfaces of said portions of said first warp and said second warp.

2. A method in accordance with claim 1 wherein the filamentary material in said portion of said second warp is disposed at an angle of about 90° with respect to the filamentary material in said portion of said first warp.

3. A method in accordance with claim 1 wherein a binding agent is employed to bind together the contacting surfaces of said first warp and said second warp.

4. A method in accordance with claim 3 wherein binding agent is applied to only one of the surfaces of said portions of said warp in contact with each other to effect binding together of the contacting surfaces.

5. A method in accordance with claim 3 wherein binding agent is applied to both surfaces of said portions of said warp in contact with each other to effect binding together of said portions of said warp.

6. A method of manufacturing a non-woven fabric which comprises assembling a plurality of contiguous, unidirectionally oriented continuous length filamentary material to form a first warp, assembling a plurality of contiguous, unidirectionally oriented continuous length filamentary material to form a second warp, applying binding agent to one surface of said first warp and applying binding agent to one surface of said second warp and cutting a portion of said second warp and placing said portion of said second warp onto a portion of said first warp such that the surfaces of said warps to which said binding agent is applied are in surface to surface contact with each other to effect binding of said second warp to said first warp, the filamentary material in said second warp bound to the filamentary material in said first warp being in non-parallel relationship with respect thereto.

7. A method of manufacturing a non-woven fabric which comprises advancing a predetermined length of a first warp made up of contiguous, unidirectionally oriented continuous length filamentary material to a transfer station, applying onto said first warp at said transfer station into surface to surface contact therewith a severed length of second warp made up of contiguous, unidirectionally oriented continuous length filamentary material, the length of said second warp being equal to the width of said first warp, said second warp being applied to said first warp such that the surfaces thereof are in contact in a given plane and such that the filamentary material comprising said second warp is in non-parallel relationship with respect to the filamentary material in said first warp, binding the thus-applied length of said second warp to said predetermined length of said first warp, and recovering the resulting bonded first and second warps as a non-woven fabric product.

8. A method in accordance with claim 7 wherein binding agent is applied to the filamentary material to bind the same together to form said first and second warps.

9. A method of manufacturing a non-woven fabric which comprises warping a plurality of separate continuous length filamentary materials to form a first warp wherein all of said filamentary material is disposed in a contiguous, unidirectionally oriented disposition, applying binding agent to only one surface of said first warp, warping a plurality of separate continuous length filamentary material to form a second warp wherein all of said filamentary material is disposed in a contiguous, unidirectionally oriented disposition, cutting a predetermined length from said second warp, applying binding agent to only one surface of said predetermined length of said second warp, advancing said predetermined length of the resulting first warp to a transfer station, placing into surface-to-surface contact with said first warp at said transfer station said predetermined length of said second warp, the length of said second warp placed into surface-to-surface contact with said first warp at said transfer station being substantially equal to the width of said first warp, said second warp being applied to said first warp at said transfer station such that the surfaces thereof coated with said binding agent are in contact and such that the filamentary material comprising said second warp is disposed in non-parallel relationship with respect to the filamentary material in said first warp and treating the resulting assembled first and second warps to activate said binding agents thereon to effect binding of said second warp to said first warp.

10. A method in accordance with claim 9 wherein the binding agent applied to one of said warps comprises a dispersion of a thermoplastic material.

11. A material in accordance with claim 10 wherein said thermoplastic material is polyvinyl chloride.

12. A method in accordance with claim 9 wherein the filamentary material in one of said warps comprises cotton.

13. A method in accordance with claim 9 wherein the filamentary material in one of said warps comprises a synthetic fiber.

References Cited by the Examiner

UNITED STATES PATENTS

| | | | |
|---|---|---|---|
| 799,374 | 9/1905 | Gray et al. | 161—57 XR |
| 831,034 | 9/1906 | Boucher | 156—519 |
| 1,108,354 | 8/1914 | Fowler | 156—204 |
| 2,936,202 | 5/1960 | Stevenson | 156—177 |
| 3,029,179 | 4/1962 | Wilson et al. | 156—177 |

FOREIGN PATENTS

| | | |
|---|---|---|
| 167,150 | 3/1956 | Australia. |
| 694,916 | 7/1953 | Great Britain. |

EARL M. BERGERT, *Primary Examiner.*

A. WYMAN, *Examiner.*

R. H. CRISS, R. J. CARLSON, *Assistant Examiners.*